INVENTOR.
JOHN KOHLER
BY
Kenway, Jenney, Witter-Hildreth
ATTORNEYS

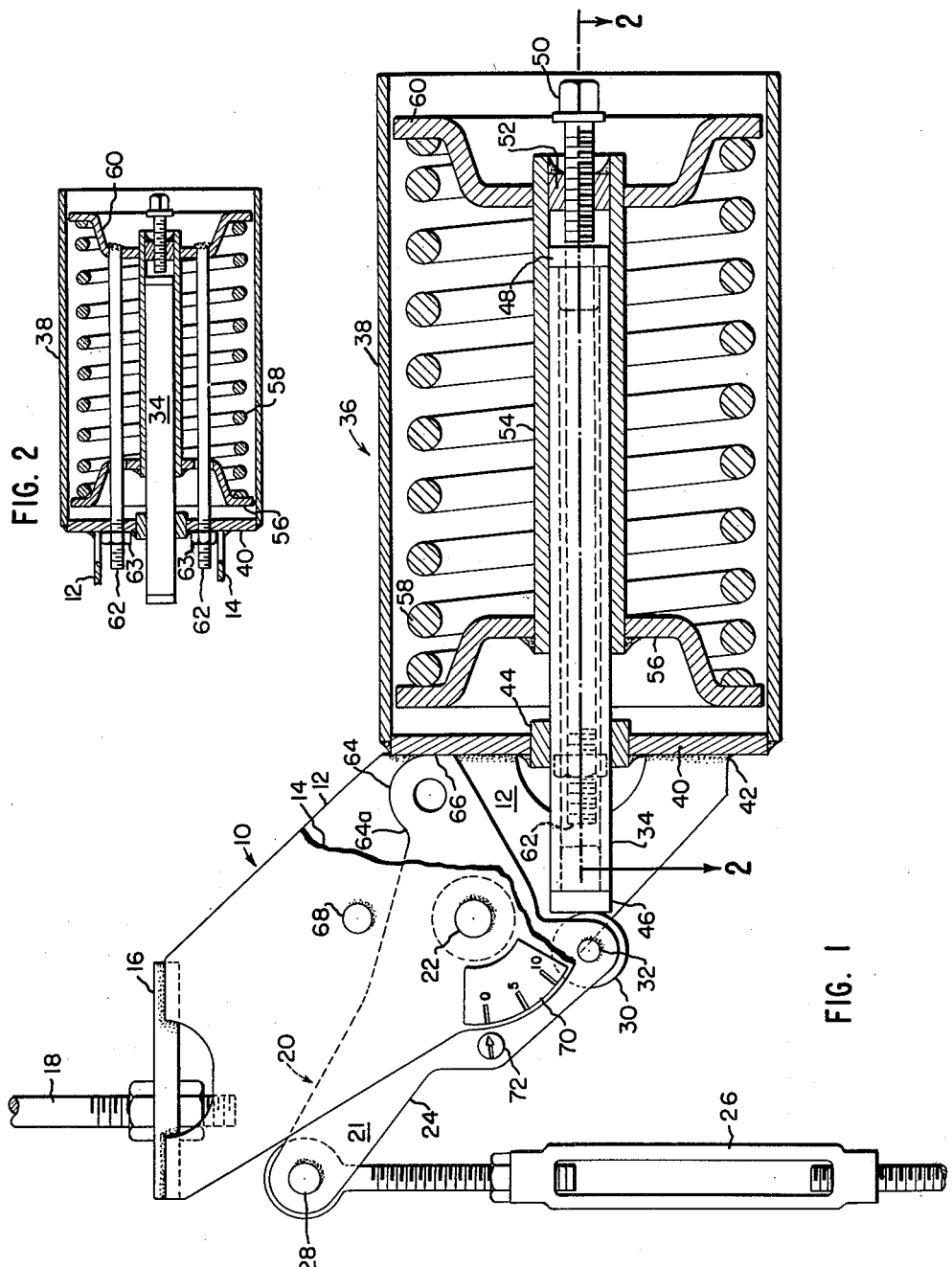

United States Patent Office 3,048,359
Patented Aug. 7, 1962

3,048,359
CONSTANT SUPPORT PIPE HANGER
John Kohler, Clifton, N.J., assignor to Carpenter and Paterson, Inc., Cambridge, Mass., a corporation of Massachusetts
Filed Sept. 14, 1959, Ser. No. 839,843
6 Claims. (Cl. 248—54)

This invention relates to a novel and improved "constant support" for pipes and the like.

In the support of a pipe or like member which is subject to substantial expansion and contraction, such as in the case of a steam pipe, it is necessary to provide a support or hangers which will accommodate displacement of the pipe caused by its expansion or contraction. Further, it is desirable, if not necessary, that the pipe support not only accommodate such movements of the pipe but also that it not resist any such movement in order to assure that fracture of the pipe will not occur as a result of high stresses which may build up because of a restraint against movement. Accordingly, there have been developed various structures for vertically supporting pipes which provide a supporting force on the pipe which varies only a relatively small amount over a relatively large range of displacement of the pipe from a mean position. Such pipe supports, because of the substantially constant supporting force that they provide are commonly referred to as "constant supports."

A known construction of a previously available constant support generally comprises a frame on which is pivotally mounted a bell crank or the like. One arm of the bell crank pivotally mounts a rod which is adapted to support a pipe, with the axis of the rod pivot being parallel to and spaced from the axis of the bell crank pivot. The other arm of the bell crank is pivotally connected to a link which is mounted for movement wth one end of a coil spring which in turn is mounted for movement about a fixed pivot on the frame. The axis of the link pivot on the bell crank as well as the axis of the spring pivot are parallel to and spaced from the bell crank pivot axis. As the load supporting rod is moved longitudinally of itself, the spring will be compressed or expanded while at the same time the spring will be pivoted relative to the frame. In a static condition of such a device, and with a load of fixed value carried by the load supporting rod, there will be one moment about the bell crank pivot due to the load and a second oppositely directed moment about the bell crank pivot by reason of the force of the spring, which is prestressed. With proper location of the four pivots of the device relative to each other, a force will be provided along the supporting rod axis which is substantially equal and opposite to the force on the rod exerted by the load. While in some cases it has been alleged that by a careful and particular location of the four pivots of the device there may be provided an exactly equal counterbalancing force for the load, in practice it has been found that such is seldom if ever the case. The reasons for variations in the counterbalancing force provided by such a device will be obvious when it is considered that it is not economically practical to provide springs which will have a completely linear force versus displacement characteristic, and also when the elements of friction, wear, and reasonable tolerances are considered. Further, commercially available constant supports have in the past been of relatively complex and expensive construction and in many cases have been of an undesirably large size, often requiring space which cannot be readily or efficiently made available.

It is the primary object of this invention to provide a constant support hanger for pipes and the like which is of novel and improved construction, which is simpler and more economical in construction than constant supports heretofore commercially available, and which is of lesser size so as to require a minimum of space for its installation.

It is a further object of this invention to provide a constant support hanger of the type described which is easily adjustable so as to accommodate variations in the weight of a load supported, which will provide a substantially constant support over a relatively wide range of displacement of a load supported thereby, and which has relatively few parts and yet is rugged so as to provide a trouble-free extended service life.

Briefly and in one aspect thereof, this invention contemplates a constant support comprising a frame on which is pivotally mounted a bell crank having a pair of arms. A load support rod is pivotally connected to one of the bell crank arms. A roller is rotatably carried at the end of the other bell crank arm for engagement in rolling contact with one end of a piston rod which is longitudinally biased by a spring carried by the frame. The spring and rod thus provide deformable resilient means which bias the bell crank in a direction of movement opposite that caused by the load so as to provide a counterbalancing force for the load. A support constructed in accordance with my invention will provide a counterbalancing force for the load supported thereby which will, within the limits of the device, have a relatively small variation, and thus the device fulfills the requirements of a "constant support." It should be noted that the constant support of my invention has only two actual pivots, the first being the bell crank pivot, and the second being the pivot for the load supporting arm. The rolling contact between the roller and piston rod thus eliminates two of the pivots required in constant support hangers heretofore commercially available and particularly eliminates the necessity for pivotally mounting the spring or spring housing of the device. Where the spring or spring housing is pivotally mounted on the frame, it will be apparent that a greater space is necessary for the installation of the support in order to accommodate the swinging movement of the spring. A more detailed understanding of this as well as other aspects of my invention together with other objects and advantages thereof may be had by reference to the following detailed description taken in connection with the accompanying drawings, in which:

FIG. 1 is a side elevational view, partly in section, of a constant support hanger constructed in accordance with my invention;

FIG. 2 is a reduced top view, in section, of the spring housing of the constant support hanger of FIG. 1;

Figure 3:
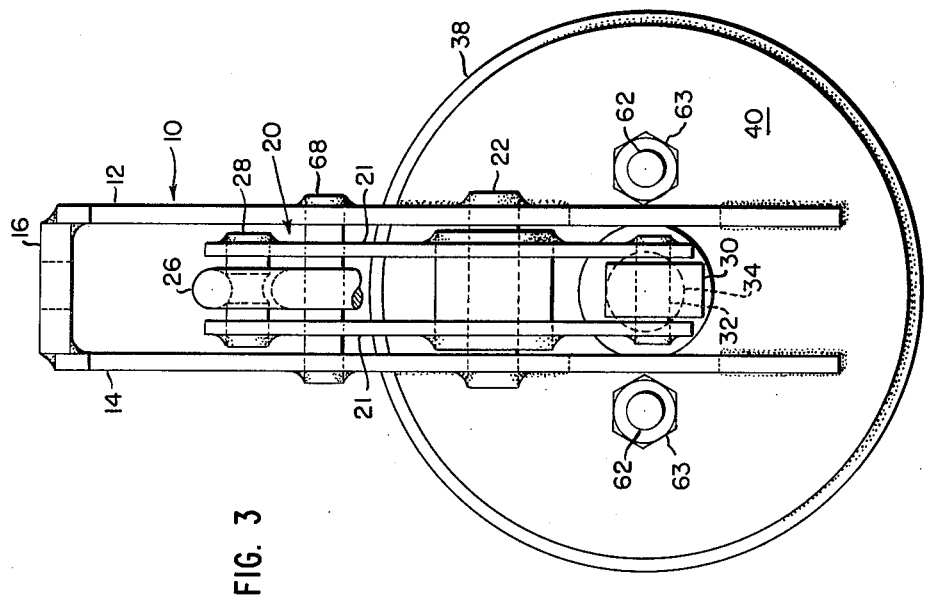
FIG. 3 is an end view of the constant support hanger of FIG. 1.

With reference to the drawings and particularly to FIGS. 1 to 3, an exemplary constant support hanger constructed in accordance with this invention comprises a frame 10 including a pair of plates 12 and 14 disposed in parallel spaced relation and welded along their upper edges to a plate 16 forming a connecting web between the plates 12 and 14. The frame is adapted to be fixedly mounted to a supporting member such as a girder or other frame of a building by means of a rod 18 secured to the web 16. A bell crank 20 is pivotally mounted on the frame 10 and comprises a pair of plate members 21 disposed in parallel spaced relation and located between the plates 12 and 14 forming the frame. A pivot pin 22 mounts the plates 21 on the plates 12 and 14. Each of the plates 21 has a support arm or lever 24 extending radially away from the pivot 22. A load supporting rod 26 is pivotally mounted at one end on a pivot 28 at the outer ends of the arms 24. The axis of the pivot 28 is parallel to and radially spaced from the axis of the bell crank pivot 22.

A roller 30 is disposed between the plates 21 and is rotatably mounted thereon by a pivot pin 32, the axis of which is parallel to and spaced radially from the axis of the bell crank pivot 22. As is apparent from FIG. 1, the pivot 22 is angularly spaced about the bell crank pivot 22 from the load supporting arm pivot 28.

The roller 30 is engageable with one end of a drive member or piston rod 34 extending out of a spring housing 36, the spring housing being fixedly mounted on the frame 10. The spring housing 36 comprises a cylinder 38 on one end of which is welded an end plate 40 which in turn is welded to the plates 12 and 14 of the frame. A guide and bearing 44 is provided in the end plate 40 to accommodate sliding movement of the piston rod 34. The piston rod 34 is essentially a tubular member closed at its outer end by a plug 46 which is in rolling contact with the roller 30. The other inner end of the piston rod is closed by a similar plug 48 which is engageable by a jack screw 50 threadably engaged in a plug or other suitable member 52 welded within one end of a cylinder or tube 54. The tube 54 is slidably and concentrically arranged over the piston rod 34. The other end of the cylinder 54 is welded to a generally circular piston plate 56 disposed concentrically within the cylinder 38. The plate 56 engages one end of a preloaded coil compression spring 58 arranged concentrically over the cylinder 54 in radially spaced relation thereto. The other end of the spring 58 engages a generally circular end or base plate 60 disposed concentrically within the cylinder 38. Movement of the end plate 60 outwardly or to the right as viewed in FIG. 1 is prevented by a pair of rods 62, which, as best shown in FIG. 2, are disposed on opposite sides of the cylinder 54. Each of the rods 62 is suitably secured at one end to the base plate 60 and extends through apertures in the piston plate 56 and outwardly through the end plate 40 of the spring housing for threaded engagement with a nut 63 which bears on the outer surface of the end plate 40.

As will be apparent from FIG. 1, the spring 58 tends to urge the bell crank 20 in a clockwise direction as viewed in FIG. 1. The bell crank is provided with an ear 64 having a flat peripheral edge portion 66 forming a shoulder engageable with the end plate 40 of the spring housing 38 to limit clockwise movement of the bell crank relative to the frame 10. The frame 10 carries a stop pin 68 which engages the side 64a of the ear 64 which is opposite the flat edge 66 to limit counterclockwise movement of the bell crank.

An indicator plate 70 is mounted on the plate 14 of the frame and carries indicia for measurement of the angular travel of the bell crank from its initial starting position shown in FIG. 1. A pointer 72 on the bell crank 20 cooperates with the indicia on the indicator plate 70 to indicate angular displacement of the bell crank.

In the operation of the device just described, the frame 10 is fixedly mounted to a supporting structure, and a load such as a steel pipe is connected to the bottom end of the supporting rod 26. The spring 58 is preloaded during its assembly into the housing 36 to provide a counterbalancing moment on the bell crank 20 substantially equal to that resulting from the intended load. A fine adjustment of the spring counterbalancing moment is obtained by adjustment of the jack screw 50. If when the load is secured to the arm 26 the spring counterbalancing moment is too low, the jack screw 50 will be threaded inwardly so as to pivot the bell crank until the pointer 72 registers with the zero indicia on the plate 70, while at the same time the spring 58 will be further compressed. On the other hand, if when the load is secured to the arm 26 the counterbalancing moment provided by the spring 58 is too great, the jack screw 50 will be threaded outwardly of the housing 36 so as to relieve compression on the spring 58 until the pointer 72 registers with the zero indicia on the indicator plate 70 and the load is counterbalanced. Subsequently, for any angular position of the bell crank 20 about the pivot 22 within the operating range of the device, the moment on the bell crank 20 by reason of the counterbalancing spring 58 and associated structure will remain substantially the same so as to permit substantially unresisted vertical movement of a pipe supported by the arm 26.

Figure 4:
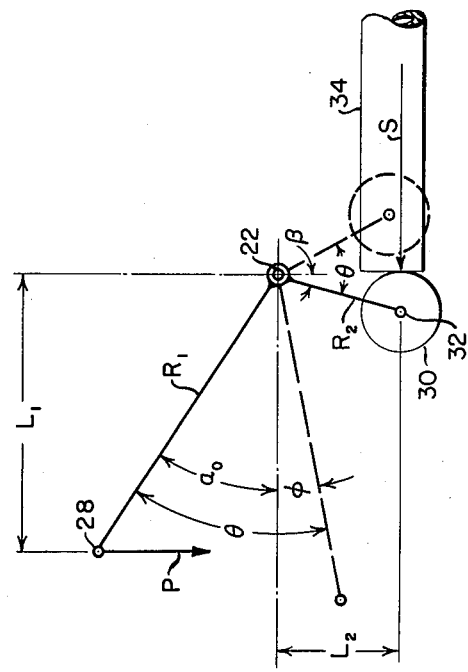
FIG. 4 is a diagrammatic representation of the moment arms and forces provided by a constant support hanger such as shown in FIG. 1.

To illustrate the constant nature of the support supplied by the device just described, reference is made to FIG. 4, wherein the distance between the pivots 22 and 28 is represented by the lever arm $R_1$, and the distance between the pivot 22 and axis of the roller 30 is represented by the lever arm $R_2$. The vector P from the pivot 28 represents the force exerted by the load supported at the pivot 28. The angle $\alpha_0$ is the angle between the initial position of the arm $R_1$ and a line drawn at right angles to the vector P and extending through the pivot 22. The length $L_1$ represents the moment arm of the load P about the pivot 22 and is equal to $PR_1 \cos \alpha_0$. The vector S represents the direction of the force exerted by spring 58 and is directed coaxially of the spring. The angle $\beta$ is the angle between the initial position of the arm $R_2$ and a line drawn at right angles to the vector S, or axis of the spring, and extending through the pivot 22. The length $L_2$ represents the moment arm of the spring force S about the pivot 22 and is equal to $R_2 \cos \beta$. The angle $\phi$ is the angle between the final or lower position of the arm $R_1$ and the line drawn at right angles to the load vector P and extending through the pivot 22. The angle $\theta$ is the angular range of travel of the arms $R_1$ and $R_2$.

It will be observed from FIG. 4 that as the load begins to move downward from the position illustrated, the arm $R_1$ will also rotate counterclockwise, thus increasing its effective length $L_1$ and therefore the moment of the load about the pivot 22. This increased moment about pivot 22 is initially compensated by two forces. As $R_1$ rotates, $R_2$ also rotates, thus initially increasing the effective length of arm $R_2$ about the pivot 22 and therefore the moment about the pivot 22 due to the initial pre-load of the spring. Also, as arm $R_2$ moves counterclockwise, as seen in FIG. 4, it increases the compression of the spring, thus increasing the spring force. The combination of the increased effective length $L_2$ and the increased spring force counterbalances the increased moment resulting from the load.

As counterclockwise rotation continues beyond the angle $\beta$, the effective length of the moment arm $R_2$ begins to decrease, although the spring force continues to increase, and the product of these two continues to increase to balance the load moment. For counterclockwise rotation greater than $\alpha_0$, the moment due to the load decreases because of a decrease in the effective length $L_1$. Although for rotation beyond the angle $\alpha_0$ the spring force continues to increase, if the angle $\beta$ is properly selected, the effective length of arm $R_2$ is now decreasing sufficiently rapidly as a function of increasing angular rotation that the total moment due to the spring force about pivot 22 also decreases and the two moments remain substantially in balance.

I have found in practical constructions that if the angle $\beta$ is made about one-half the angle $\alpha_0$, the increase and decrease in the effective length of $R_2$ is substantially correct to provide constant support. I have also found that the angle $\phi$ should be kept fairly small with respect to $\alpha_0$, e.g., about one-fifth in the specific embodiment illustrated in FIG. 4, in order to minimize the problem of compensating for both positive and negative increments in moment changes. It will be observed that the movement of the piston rod as a function of angle will be almost linear if the total angle of travel of the arm $R_2$ is limited to about 40° about the line drawn at right angles to the spring force S.

The practical design of a constant support hanger incorporating my invention is illustrated by the following example, to which, however, the invention is not, of course, limited.

It will be assumed that the load to be balanced, P, is 1,000 lbs. It will also be assumed that the total load movement to be compensated is approximately 4¼". If the arm length $R_1$ is chosen as 6" for this travel and the angle above the horizontal $\alpha_0$ is to be four times the angle below the horizontal $\phi$, values of 36° for $\alpha_0$ and 9° for $\phi$ respectively will provide a vertical travel of about 4.46", which is greater than the required 4¼". $\theta$ then becomes 45°, and the angle $\beta$, which is chosen as one-half $\alpha_0$, is then 18°. To minimize the required size of the hanger consistent with utilizing a spring of reasonable size, $R_2$ may be selected, for example, as approximately $$2'' = \frac{R_1}{3}$$

Having determined these parameters, it remains only to calculate the required spring rate and initial deflection $D_0$ to complete the hanger design. This can be accomplished by calculating the required spring force for a number of equal angular steps through the hanger travel and determining the increment in spring force required for each step. From these data a spring rate for each step may be determined. The spring rates for each angular increment will not be identical, but the desired spring rate will be the arithmetic mean of the spring rate for each step. This average spring rate provides a substantially constant support for the load with very small errors. The magnitude of this error is comparable to but not in excess of errors existing in any of the constant supports heretofore made resulting from friction, non-linear spring rate, and similar considerations.

In calculating the desired spring rate and initial deflection, a tabulation is made for various values of $\alpha_1$, this angle being the angle through which the arms $R_1$ and $R_2$ are rotated. In Table 1 below, the values of $\alpha_1$ are given in Column I.

From FIG. 4, the total load moment will be $PL_1 = PR_1 \cos(\alpha_0 - \alpha_1)$ for each $\alpha_1$. Values of load moment for each $\alpha_1$ are given in Table 1 in column II. The effective spring moment arm, $L_2$, is given by $L_2 = R_2 \cos(\beta - \alpha_1)$ for each $\alpha_1$, and the values of $L_2$ for each $\alpha$ are given in Column III of Table 1. The required spring force for each $\alpha_1$ may be calculated by dividing column II by column III, and these values are tabulated in column IV. Column V represents the difference in the spring force required at any given value of $\alpha_1$ and the required spring force at $\alpha_0$. The difference in spring deflection between the initial deflection $D_0$ and that for any value of $\alpha_1$, as seen from FIG. 4, is equal to:

$$R_2[\sin \beta - \sin(\beta - \alpha_1)]$$

This spring deflection, in inches, for the tabulated values of $\alpha_1$ is given in column VI of Table 1. By dividing the required increase in spring force (column V) by the increased spring deflection (column VI), the desired spring rate for each value of $\alpha_1$ can be determined. These values are plotted in column VII of Table 1.

Table 1

| I<br>$\alpha_1$, degrees | II<br>Load Moment (lb./in.)<br>$PR_1 \cos(\alpha-\alpha_1)$ | III<br>Effective Spring Moment Arm (in.)<br>$R_2 \cos(\beta-\alpha_1)$ | IV<br>Spring Force II/III (lbs.) | V<br>Cumulative Increase in Spring Force (lbs.) | VI<br>Cumulative Spring Deflection (ins.),<br>$R_2[\sin\beta-\sin(\beta-\alpha_1)]$ | VII<br>Necessary Spring Rate For Each $\alpha_1$ to Counterbalance Load Moment V/VI (lbs./in.) |
|---|---|---|---|---|---|---|
| 0 | 4,856 | 1.902 | 2,553 | 0 | 0 | |
| 9 | 5,347 | 1.975 | 2,707 | 154 | .3052 | 504.5 |
| 18 | 5,707 | 2.000 | 2,854 | 301 | .6180 | 487.1 |
| 27 | 5,926 | 1.975 | 3,001 | 448 | .9308 | 481.4 |
| 36 | 6,000 | 1.902 | 3,155 | 602 | 1.2360 | 487.1 |
| 45 | 5,926 | 1.782 | 3,326 | 773 | 1.5260 | 506.5 |

As the values of spring rate, K, vary for different values of $\alpha_1$ through the range of travel of the arm $R_1$, an average of the values of K is taken. Thus, for the example given, K will be determined by taking an average of the values in column VII, which results in a K of 493 lbs./in.

It will now be illustrated that with a spring having a spring rate as just determined and with the assumed parameters of a support constructed in accordance with this invention will provide substantially constant support over a given range of travel. Knowing the spring rate K, the initial deflection $D_0$ of the spring may be determined by:

$$D_0 = \frac{\text{Spring Force at } \alpha_1 = 0}{K} = \frac{2553 \text{ lbs.}}{493 \text{ lbs/in.}} = 5.178 \text{ in.}$$

It will be observed that although the difference between average and desired spring rate varies over a range of about ±2.5 percent, the actual variation from a constant supporting force is not this great. This comes about because this variation is only in the additional increments of force beyond that supplied by the initial spring deflection, the force supplied by the initial spring deflection being adjusted at the time of installation to provide exact counterbalance. From Table 1 it will be observed that the maximum additional increment of force is approximately one-fifth that of the total force. Accordingly, the actual departure from perfect theoretical constancy is only about ±0.5 percent. The precise departure from constancy may be determined as follows. As previously noted, the load moment for any angle $\alpha_1$ is:

$$PR_1 \cos(\alpha_0 - \alpha_1)$$

The restoring moment is the sum of the force due to initial spring deflection $D_0$ plus the force due to additional spring deflection times the moment arm $L_2$, i.e.:

$$R_2 \cos(\beta-\alpha)[D_0K + R_2K \sin\beta - \sin(\beta-\alpha)]$$

Solving these two equations for P we have:

$$P = \frac{R_2 \cos(\beta-\alpha)\{D_0K + R_2K[\sin\beta - \sin(\beta-\alpha)]\}}{R_1 \cos(\alpha_0-\alpha_1)}$$

This equation is solved in tabular form for the values of $\alpha_1$ used in connection with Table 1 and the values of K and $D_0$ calculated therefrom in Table 2. In this latter table, column I is the numerator of the right-hand side of the equation, column III the denominator, and column IV the quotient, representing the counterbalanced load at each angular value. It will be recalled that the assumed load was 1,000 lbs., and therefore the percentage error may be readily calculated by taking the difference between the load in column III and 1,000 lbs. and dividing by 1,000 and multiplying by 100 percent. The percentage errors are tabulated in column IV.

*Table 2*

| $\alpha_1$, degrees | $(\alpha_0-\alpha_1)$, degrees | I $\{[D_0+R_2[\sin\beta-\sin(\beta-\alpha_1)]\}KR_2\cos(\beta-\alpha_1)$ | II $R_1\cos(\alpha-\alpha_1)$ | III P I/II | IV Percent Error |
|---|---|---|---|---|---|
| 0 | 36 | 485.4 | 4.856 | 999.8 | (−).02 |
| 9 | 27 | 5,340.0 | 5.347 | 998.6 | (−).14 |
| 18 | 18 | 5,713.8 | 5.707 | 1,001.2 | +.12 |
| 27 | 9 | 5,947.1 | 5.926 | 1,003.5 | +.35 |
| 36 | 0 | 6,012.5 | 6.000 | 1.002 | +.20 |
| 45 | −9 | 5,888.6 | 5.926 | 993.6 | (−).74 |

Thus, the support described will provide a substantially constant support for a load P of 1,000 pounds with only an error of from −.74 to +.35 percent, which is only slightly greater than the ±0.5 percent obtained by the estimation previously described. It should be noted that the errors in the direction of oversupport occur near the middle portion of the range of angular travel of the arm $R_1$. In other words, the constant support tends to assist in upward movement of the pipe supported thereby. This has been found to be of some importance in hangers used in supporting steam pipes and the like which are part of a system. External helical spring supports and small pipes tend to resist the expansion of the supported pipe. Thus, by oversupporting it slightly in the mid-range, the expansion of the pipe is not prevented, thus tending to eliminate excessive strains in connections between larger and smaller pipes.

Figure 5:
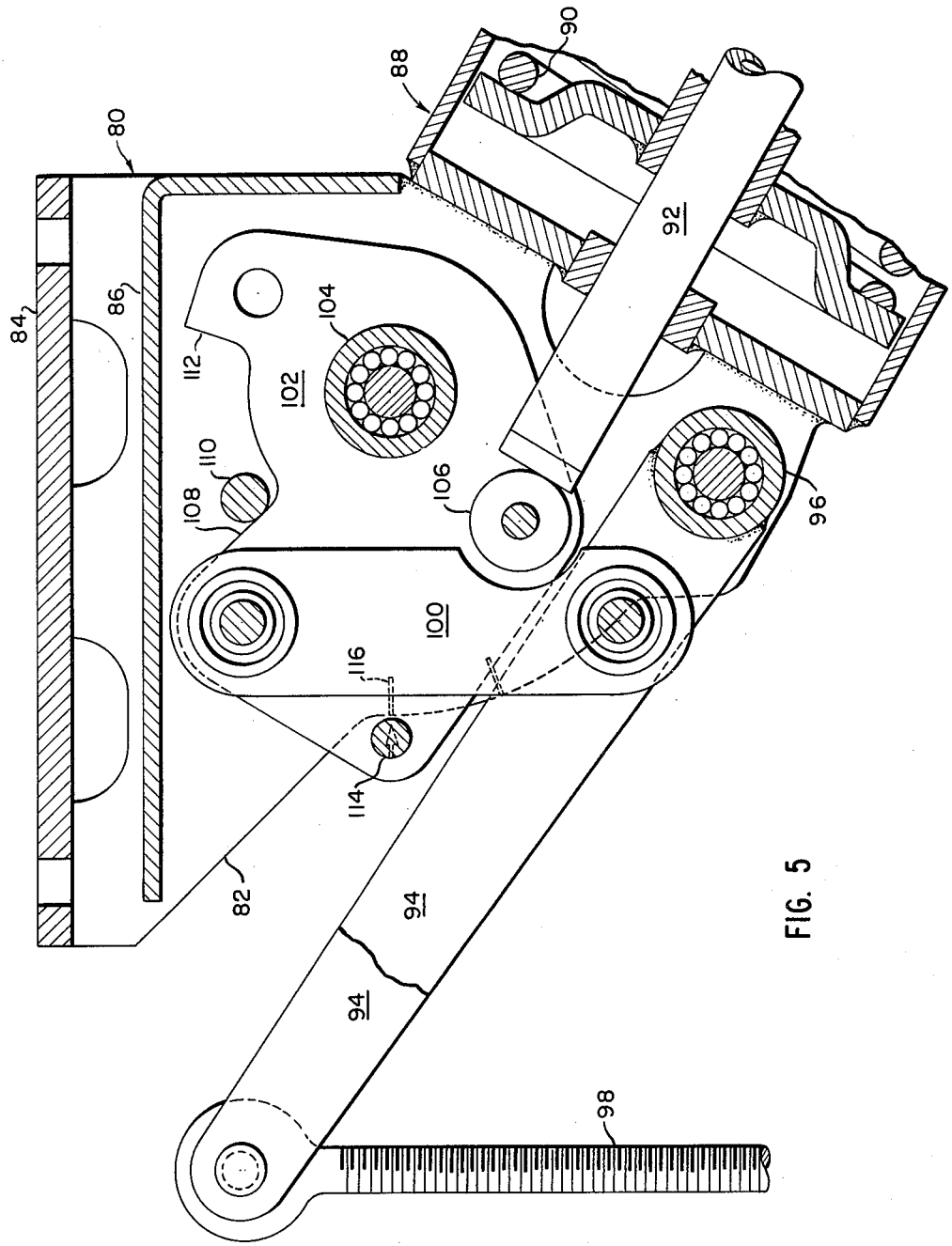
FIG. 5 is a fragmentary side elevation, partly in section, of an alternative construction for a constant support hanger constructed in accordance with my invention.

While the relationships of angles and arm lengths given in the specific example provide a superior device, it will be understood that these relationships may be varied while still obtaining a satisfactory constant support. Such variations will readily occur to those skilled in this art.

Where it is desired to provide for a relatively large load displacement, e.g. from 9 to 12 inches, the modified constant support shown in FIG. 5 is advantageous. This embodiment of the invention is generally similar to that of FIGS. 1 to 3 and comprises a frame 80 adapted to be fixedly secured to a building. The frame 80 comprises a pair of spaced parallel plates 82, only one of which is shown, with a plate or web 84 connecting the top edges of the plates 82. A spring housing 88 is secured as by welding to the frame 80. The spring housing is similar to the housing 36 previously described and contains a coil compression spring 90 biasing a piston or rod 92 outwardly or to the left as viewed in FIG. 5. Provisions similar to those of the support of FIG. 1 are provided for mounting the spring 90 and for fine adjustment of the preloading of the spring.

A pair of spaced parallel levers 94 are pivotally mounted at one end on the frame 80 by an antifriction bearing 96. A load supporting rod 98 is pivotally mounted at its upper end between the levers 92 and at the end of the levers opposite the bearing 96. A link or lever 100 is pivotally connected at one end to the levers 94 at a point intermediate the ends of the levers. The link is disposed between the levers 94 and is connected at its other end to a pair of spaced parallel plates or bell cranks 102 (only one of which is shown) disposed on opposite sides of the link. The plates 102 are pivotally mounted on the frame 80 by an antifriction bearing 104 and carry between them a roller 106 engageable in rolling contact with the projecting outer end of the piston rod 92. The plates 104 are each provided with a shoulder 108 extending generally radially of the bearing 104 and engageable with a stop pin 110 on the frame to limit clockwise movement of the plates 102 relative to the frame as viewed in FIG. 5. The plates 102 are further each provided with a second shoulder 112 which is engageable with the stop pin 110 to limit counterclockwise movement of the plates as viewed in FIG. 5. An indicator pin 114 is carried by one of the plates 102 and cooperates with indicia 116 on one of the frame plates 82 to provide a visual indication of the amount of angular travel of the plates 102 about their axis.

As will be apparent from FIG. 5, movement of the levers 94 in a counterclockwise direction will cause a corresponding counterclockwise movement of the plates 102. This counterclockwise movement of the plates 102 will, by reason of the cooperation of the roller 106 and piston rod 92, effect further compression of the spring 90. The theory of operation of the device of FIG. 5 is similar to that of FIGS. 1 to 3 previously described. Accordingly, there is provided a load supporting force along the load supporting rod 98 which is opposite and substantially equal to the load supported by the rod 98 for all positions of the levers 94 within the range of the device. As can be seen from a consideration of FIG. 5, the arrangement of levers and plates is such that a reducing linkage is provided between the levers 94 and the piston rod 92. Accordingly, while an increased amount of travel of the outer end of the arms 94 is provided, the over-all compression of the spring 90 is maintained at a relatively low level. In this manner a large range of operation is possible while still maintaining a relatively small over-all size for the spring 90 and accordingly the spring housing 88.

It can thus be seen that I have provided a constant support device of novel and improved construction which provides, for all intents and purposes, a constant supporting force for a load over a relatively large displacement of the load. The constant support of this invention can be seen to be relatively simple and economical to construct, having relatively few parts, while at the same time the support is rugged and dependable so as to provide an extended trouble-free service life.

While the invention has been described in terms of the specific embodiments and examples shown in the accompanying drawings, it will, of course, be apparent to those skilled in the art that various modifications and alterations could be made in the specific structures shown and described without departing from the scope of the invention. Accordingly, the foregoing description and accompanying drawings are to be taken only in an illustrative sense and not as limiting the invention; and the invention is to be limited only by the appended claims, which shall be construed to include within their scope all structure which logically falls within the language of these claims.

I claim:

1. A constant support for pipes comprising a frame, a spring mounted on the frame with its line of action being fixed relative to the frame, a load lever having means at one end for pivotally supporting a load on a first axis extending at right angles to said line of action, said load lever being pivotally mounted on said frame for limited movement about a second axis extending parallel to said first axis, said load lever being movable from a start position in which the lever arm of said load lever defines a first acute angle with said line of action to a maximum position in which said lever arm defines a substantially smaller second acute angle with respect to said line of action, said lever arm being inclined in opposite directions relative to said line of action in said start and maximum positions respectively, a second lever mounted for movement with said load lever about said second axis and having a lever arm substantially less than that of said first lever, and means providing a rolling contact driving connection between said second lever and said spring to urge said load lever toward said start position, the lever arm of said second lever extending at a third acute angle to a reference line extending at right angles to said line of action and through said second axis when said load lever is in said start position, said third angle being greater than said second angle but less than said first angle, the lever arm of said second lever being inclined in opposite directions relative to said reference line when said second lever is in the positions corresponding to said start and maximum positions of said load lever, said spring being preloaded a predetermined amount when said load lever is in said start position.

2. In a constant support as described in claim 1, said spring being a coil spring mounted with its longitudinal axis fixed relative to said frame, said means providing a rolling contact driving connection comprising a drive member connected at one end to one end of said spring and supported for movement coaxially of the spring, and a roller mounted on one of said second lever and drive member and bearing on the other.

3. In a constant support as described in claim 1, said third angle being approximately ½ of said first angle.

4. In a constant support as described in claim 2, said second angle being approximately ⅕ of said first angle.

5. A constant support of a two pivot type comprising a frame, a bell crank pivotally supported on the frame and having angularly related load and balance members, means for pivotally supporting a load on the load member of the bell crank, a preloaded coil spring supported on the frame with its longitudinal axis fixed relative to the frame and extending at right angles to the axis of the bell crank, a drive member guided for movement coaxially of the spring, one end of the drive member being connected to one end of the spring, and means drivingly connecting the other end of said drive member and the balance member of said bell crank, whereby a load carried by said load member will be counterbalanced in various angularly spaced positions of the bell crank, said last mentioned means including a roller mounted on one of said drive and balance members and bearing on the other.

6. A constant support comprising a frame, a bell crank pivotally mounted on the frame and having a pair of angularly related arms, means for supporting a load from one arm of the bell crank for pivotal movement relative to said one arm about an axis extending in parallel radially spaced relation to the axis of the bell crank pivot, a roller rotatably mounted on the other arm for movement about an axis extending in radially spaced parallel relation to the axis of the bell crank pivot, a spring housing fixedly mounted on the frame and containing a preloaded coil compression spring having an axis extending at right angles to the axis of the roller, a drive member slidably supported for movement longitudinally of the spring, means for selectively adjusting the position of the drive member and said one end of the spring relative to said housing to vary the preloading of the spring including a fixed baseplate for the other end of the spring and a movable baseplate for said one end of the spring and adjustable means connecting one end of said drive member with said movable base member to provide a driving connection therebetween and to provide selective adjustment of the spring preloading, the drive member projecting from one end of the housing and being engaged at its projecting end with said roller in rolling contact to provide for compression of said spring in response to pivotal movement of the bell crank in one direction, and stop means for limiting movement of the bell crank in both directions of movement about the pivot.

References Cited in the file of this patent

UNITED STATES PATENTS

| | | |
|---|---|---|
| 2,062,000 | Garelli | Nov. 24, 1936 |
| 2,395,730 | Farkas | Feb. 26, 1946 |
| 2,593,502 | Thomson | Apr. 22, 1952 |
| 2,867,399 | Alexeff | Jan. 6, 1959 |
| 2,939,663 | Suozzo | June 7, 1960 |
| 2,946,547 | Grabe | July 26, 1960 |